United States Patent
Umezaki et al.

(10) Patent No.: US 11,833,934 B2
(45) Date of Patent: Dec. 5, 2023

(54) SEAT SLIDE ADJUSTER

(71) Applicant: DELTA KOGYO CO., LTD., Aki-gun (JP)

(72) Inventors: Kiyonori Umezaki, Aki-gun (JP); Etsunori Fujita, Higashihiroshima (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 17/631,339

(22) PCT Filed: Jul. 31, 2020

(86) PCT No.: PCT/JP2020/029544
§ 371 (c)(1),
(2) Date: Jan. 28, 2022

(87) PCT Pub. No.: WO2021/020578
PCT Pub. Date: Feb. 4, 2021

(65) Prior Publication Data
US 2022/0281359 A1    Sep. 8, 2022

(30) Foreign Application Priority Data
Jul. 31, 2019 (JP) ................. 2019-141841

(51) Int. Cl.
B60N 2/07 (2006.01)

(52) U.S. Cl.
CPC ......... B60N 2/0727 (2013.01); B60N 2/0705 (2013.01); B60N 2/0715 (2013.01); B60N 2205/20 (2013.01)

(58) Field of Classification Search
CPC .. B60N 2/0727; B60N 2/0705; B60N 2/0715; B60N 2205/20
(Continued)

(56) References Cited

U.S. PATENT DOCUMENTS 6,089,521 A * 7/2000 Tarusawa ............... B60N 2/085
296/65.14
7,314,204 B2 * 1/2008 Kohmura ............. B60N 2/0705
248/430
(Continued)

FOREIGN PATENT DOCUMENTS

JP  10-16611 A  1/1998
JP  2000-233671 A  8/2000
(Continued)

OTHER PUBLICATIONS

International Search Report dated Sep. 29, 2020 in PCT/JP2020/029544 filed on Jul. 31, 2020, (2 pages).

Primary Examiner — Nkeisha Smith
(74) Attorney, Agent, or Firm — Oblon, McClelland, Maier & Neustadt, L.L.P.

(57) ABSTRACT

Rattling and abnormal sound between an upper rail and a lower rail are reduced, and sliding is more smoothly performed. Sliding resistance reducing members (14, 15) include retainers (141, 151) formed each in a substantially L shape in a cross section and including first retaining wall portions (1411, 1511) and second retaining wall portions (1412, 1512) located between vertical wall portions (11b, 12d) and between bottom wall portions (11a, 12c) of a lower rail (11) and an upper rail (12). The first ball members (142, 152) are disposed in middle positions of the first retaining wall portions (1411, 1511), and the second ball members (143, 153) are disposed in positions apart from the vertical wall portions toward the center in the width direction of the lower rail (11) in the second retaining wall portions (1412, 1512).

4 Claims, 8 Drawing Sheets

(58) Field of Classification Search
USPC .................................................. 248/429, 430
See application file for complete search history.

(56) References Cited

U.S. PATENT DOCUMENTS

| | | | | |
|---|---|---|---|---|
| 8,556,222 B2* | 10/2013 | Yamada | ............. | F16C 29/0614 |
| | | | | 296/65.14 |
| 8,814,123 B2* | 8/2014 | Suzuki | ..................... | B60N 2/06 |
| | | | | 296/65.01 |
| 9,126,506 B2* | 9/2015 | Dick | ........................ | B60N 2/12 |
| 9,132,750 B2* | 9/2015 | Jahner | .................. | B60N 2/0875 |
| 9,597,980 B2* | 3/2017 | Morishita | .............. | B60N 2/075 |
| 9,764,660 B2* | 9/2017 | Takiya | .................. | B60N 2/0818 |
| 10,486,554 B2* | 11/2019 | Napau | ..................... | B60N 2/06 |
| 10,518,666 B2* | 12/2019 | Hagan | .................. | B60N 2/0722 |
| 10,759,309 B2* | 9/2020 | Flick | .................... | B60N 2/0875 |
| 11,052,788 B2* | 7/2021 | Sprenger | ................ | B60N 2/067 |
| 11,173,809 B2* | 11/2021 | Imamura | ................ | B60N 2/0715 |
| 11,230,208 B2* | 1/2022 | Flick | .................... | B60N 2/0818 |
| 11,299,072 B2* | 4/2022 | Quast | .................. | B60N 2/0715 |
| 2009/0058169 A1* | 3/2009 | Soga | .................... | B60N 2/0705 |
| | | | | 297/463.1 |
| 2010/0320353 A1* | 12/2010 | Kojima | .................. | F16C 33/40 |
| | | | | 297/344.1 |
| 2012/0006963 A1* | 1/2012 | Yoshida | ............... | B60N 2/0705 |
| | | | | 248/429 |
| 2012/0032060 A1* | 2/2012 | Suzuki | ................. | B60N 2/0705 |
| | | | | 248/430 |
| 2014/0231610 A1* | 8/2014 | Hoshihara | ............ | B60N 2/0818 |
| | | | | 248/430 |
| 2014/0232157 A1 | 8/2014 | Hoshihara et al. | | |
| 2018/0022237 A1* | 1/2018 | Nomura | ................ | F16C 29/063 |
| | | | | 384/45 |
| 2018/0079325 A1* | 3/2018 | Hayashi | ............... | B60N 2/0843 |
| 2019/0375314 A1* | 12/2019 | Quast | .................. | B60N 2/0727 |
| 2020/0282870 A1* | 9/2020 | Hsi | ...................... | B60N 2/0727 |
| 2022/0234477 A1* | 7/2022 | Imamura | ................ | B60N 2/067 |

FOREIGN PATENT DOCUMENTS

| | | |
|---|---|---|
| JP | 2008-44518 A | 2/2008 |
| JP | 2014-159197 A | 9/2014 |
| JP | WO 2016/181815 A1 | 11/2016 |
| JP | 2018-58576 A | 4/2018 |
| WO | WO 2018/062076 A1 | 4/2018 |

\* cited by examiner

SEAT SLIDE ADJUSTER

TECHNICAL FIELD

The present invention relates to a seat slide adjuster used in a seat for vehicles such as automobiles, airplanes, trains, ships, and buses.

BACKGROUND ART

A seat slide adjuster includes a lower rail mounted on a floor of a vehicle and an upper rail provided to be slidable with respect to the lower rail, and coupled to a seat frame. To reduce sliding resistance of the upper rail to the lower rail, the seat slide adjuster is provided with sliding resistance reducing members between the two of them. For example, as indicated in Patent Document 1, the respective sliding resistance reducing members are disposed in the front vicinity and the rear vicinity of the lower rail and the upper rail and include retainers each made of a substantially rectangular and flat synthetic resin or the like and ball members such as steel balls rotatably supported by the retainers.

PRIOR ART DOCUMENT

Patent Document

Patent Document 1: Japanese Patent Application Laid-open No. 2000-233671

SUMMARY OF THE INVENTION

Problems to be Solved by the Invention

The sliding resistance reducing member disclosed in Patent Document 1 includes a total of four ball members, two each of which are included along a longitudinal direction of the lower rail for each of an upper portion and a lower portion of the substantially rectangular retainer. The ball members provided in the upper portion of the retainer are disposed to correspond to a corner portion of a boundary between a vertical wall portion and an upper wall portion of the lower rail, and the ball members provided in the lower portion of the retainer are disposed to correspond to a corner portion of a boundary between the vertical wall portion and a bottom wall portion of the lower rail. That is, the ball members are disposed to correspond to portions having high rigidity in the lower rail. In contrast with this, in the upper rail, to such ball members, not the corner portion but an upper surface of a vertical wall portion or an inclined surface inclined to face the lower corner portion of the lower rail corresponds. Accordingly, the ball members abut on the portions having high rigidity in the lower rail and abut on portions having relatively low rigidity in the upper rail, resulting in that due to the use, a local deformation occurs in the ball members in the upper rail, which sometimes causes an occurrence of rattling and abnormal sound between the two of them. The rigidity is considered to be enhanced by increasing a sheet thickness of a raw material forming the upper rail or the like as means of solving the above, but in that case, a weight of the seat slide adjuster increases.

The present invention was made in consideration of the above and has an object to provide a seat slide adjuster capable of reducing rattling and abnormal sound between an upper rail and a lower rail to slide them more smoothly, and moreover, also capable of reducing a sheet thickness of a raw material forming the upper rail or the lower rail to contribute to a reduction in weight.

Means for Solving the Problems

To solve the above problem, a seat slide adjuster of the present invention includes:
a lower rail;
an upper rail slidably provided in the lower rail and coupled to a seat frame; and
sliding resistance reducing members respectively provided on a left side and a right side with a center in a width direction orthogonal to a longitudinal direction of the lower rail sandwiched for reducing, between the lower rail and the upper rail, sliding resistance to each other,
the sliding resistance reducing member includes:
a retainer in a substantially L shape in a cross section, the retainer including a first retaining wall portion located between vertical wall portions of the lower rail and the upper rail and a second retaining wall portion located between bottom wall portions of the lower rail and the upper rail and extending from a lower portion of the first retaining wall portion toward the center in the width direction in the cross section along the width direction;
a first ball member supported by the first retaining wall portion and being capable of abutting on the vertical wall portions of the lower rail and the upper rail; and
a second ball member supported by the second retaining wall portion and being capable of abutting on the bottom wall portions of the lower rail and the upper rail,
the first ball member is supported in a position apart from both an upper wall portion and the bottom wall portion of the lower rail, and the second ball member is supported in a position apart from the vertical wall portion toward the center in the width direction of the lower rail.

Preferably, the first ball member is larger in diameter than the second ball member.

Preferably, a plurality of the first ball members and a plurality of the second ball members are provided along the longitudinal direction.

Preferably, a plurality of the sliding resistance reducing members are provided at a predetermined distance in the longitudinal direction, and
the disposition number of the second ball members supported by the retainer disposed close to a rear portion is larger than the disposition number of the second ball members supported by the retainer disposed close to a front portion.

Effect of the Invention

In the seat slide adjuster of the present invention, the sliding resistance reducing members each have the retainer formed in the substantially L shape in the cross section and having the first retaining wall portion and the second retaining wall portion located between the vertical wall portions and between the bottom wall portions of the lower rail and the upper rail, and the first ball members are provided in the middle portion apart from both the upper wall portion and the bottom wall portion of the lower rail in the first retaining wall portion, and the second ball members are provided in the position apart from the vertical wall portion toward the center in the width direction of the lower rail in the second retaining wall portion. That is, the first ball members are disposed not in such a portion having high rigidity as, in the vertical wall portion of the lower rail, a corner portion between the upper wall portion and it or between the bottom wall portion and it but in a position having relatively lower rigidity than the corner portion. The second ball members are also disposed not in contact with the corner portion having high rigidity but close to the center in the width direction, and support the bottom wall portion of the upper rail. In the present invention, this eliminates such an occurrence of a local deformation in the upper rail as in the case of disposing conventional ball members at the corner portions, and moreover, causes the retainer in the substantially L shape in the cross section and the first and second ball members retained therein to integrally exhibit predetermined rigidity even though the ball member is not disposed at the corner portion having high rigidity. Hence, at the time when an external force is input, the sliding resistance reducing members secure rigidity in a lateral direction of the lower rail and the upper rail, and simultaneously, the second ball members receive force in an up-down direction, and the force is received by deflections in sidewall portions of the upper rail, a middle range in the bottom wall portion of the lower rail, and the like which do not directly correspond to disposed positions of the sliding resistance reducing members. Therefore, rattling between the upper rail and the lower rail is eliminated and smoothness at the time of sliding is secured, which enables prevention of abnormal sound. Further, it is preferable that the first ball member is larger in diameter than the second ball member and thereby the rigidity in the lateral direction can be kept higher.

Accordingly, having the above-described sliding resistance reducing member in the substantially L shape in the cross section makes it possible to suppress large reduction of slidability and also contribute to reduction in weight even though as a raw material forming the lower rail or the upper rail, the one having a smaller thickness is used.

MODES FOR CARRYING OUT THE INVENTION

Figure 1:
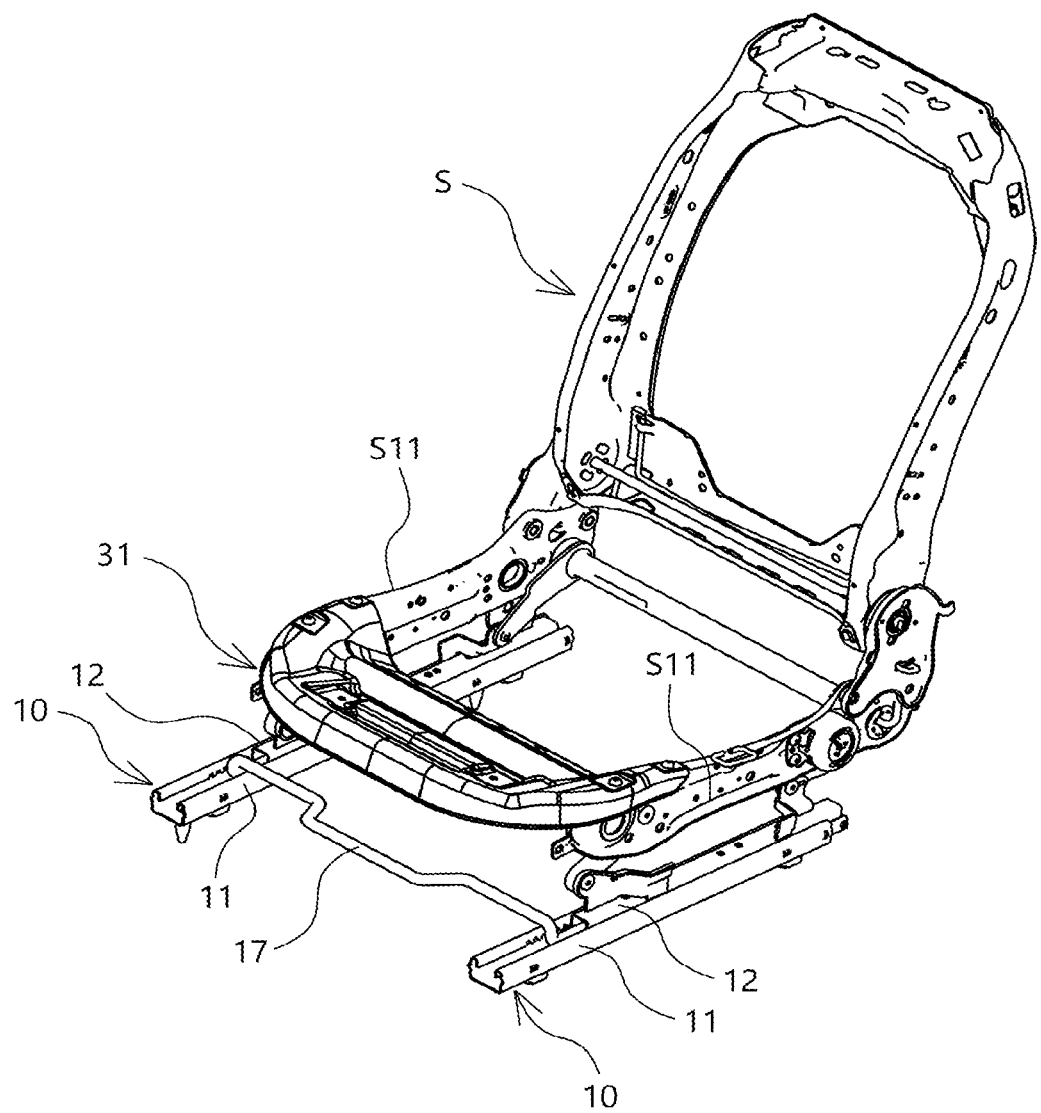
FIG. 1 is a perspective view illustrating a state where a pair of right and left seat slide adjusters according to one embodiment of the present invention are disposed to support a seat frame.
Figure 2:
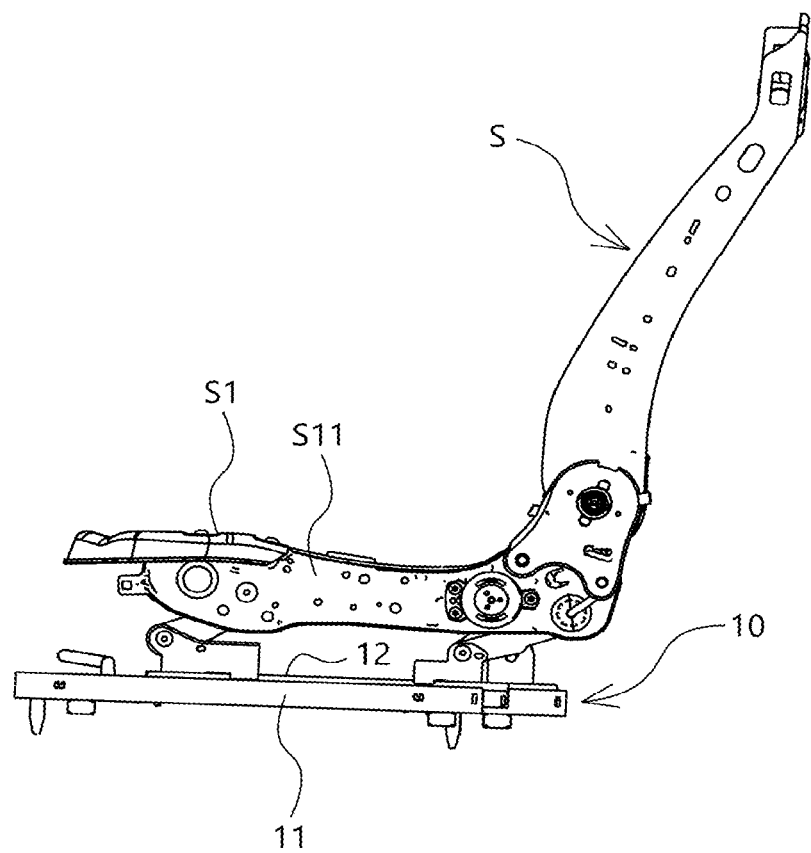
FIG. 2 is a side view of FIG. 1.
Figure 3:
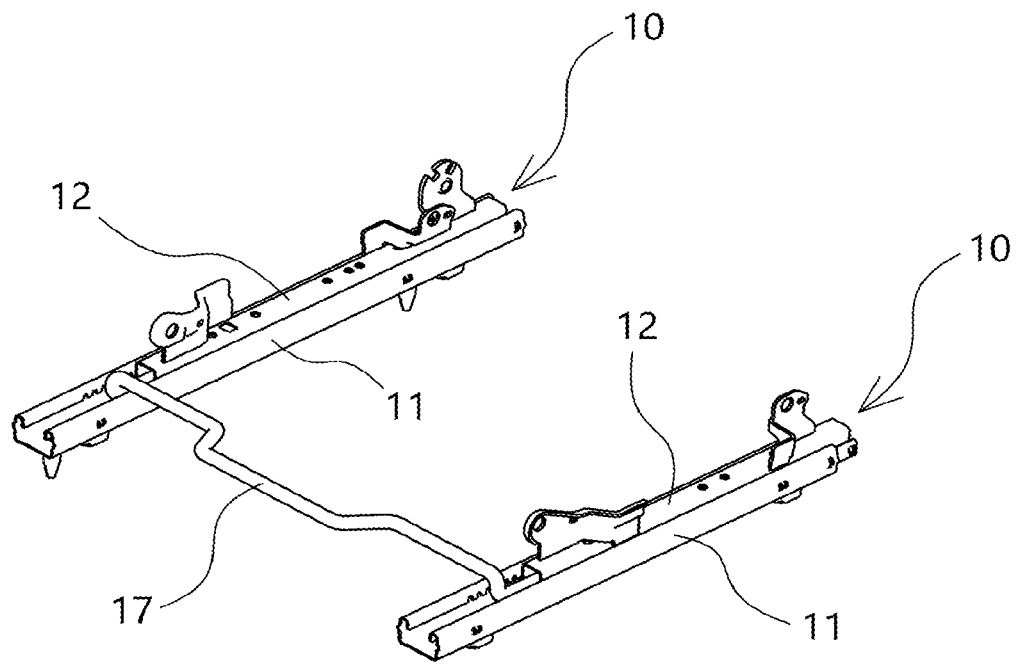
FIG. 3 is a perspective view illustrating the pair of right and left seat slide adjusters after removing the seat frame in FIG. 1.

The present invention will be hereinafter described in more detail based on an embodiment illustrated in the drawings. As illustrated in FIG. 1 to FIG. 3, a seat frame S is provided to be slide-adjustable frontward and rearward by using a pair of right and left seat slide adjusters 10, 10 of this embodiment disposed at a predetermined distance in a width direction of a vehicle body. Under a front edge portion of a seat cushion frame S1, a slide lever 17 extending between the seat slide adjusters 10, 10 disposed on the right and left is disposed. The slide lever 17 connects release levers 161, 161 of later-described locking mechanisms 16, 16 provided in the right and left seat slide adjusters 10, 10 with each other, and has a structure in which a person operates the slide lever 17 to thereby release a lock.

In the following description, with a central focus on FIG. 4 to FIGS. 8, only one of the seat slide adjusters 10 is illustrated to describe its detailed structure, but both of the right and left seat slide adjusters 10, 10 illustrated in FIG. 1 to FIG. 3 have the same structure.

The seat slide adjuster 10 of this embodiment includes a lower rail 11, an upper rail 12 slidable in a longitudinal direction of the lower rail 11, and the like, the lower rail 11 is fixed to a vehicle body floor, and a side frame S11 of the seat cushion frame S1 of the seat frame S is coupled to the upper rail 12.

Figure 4:
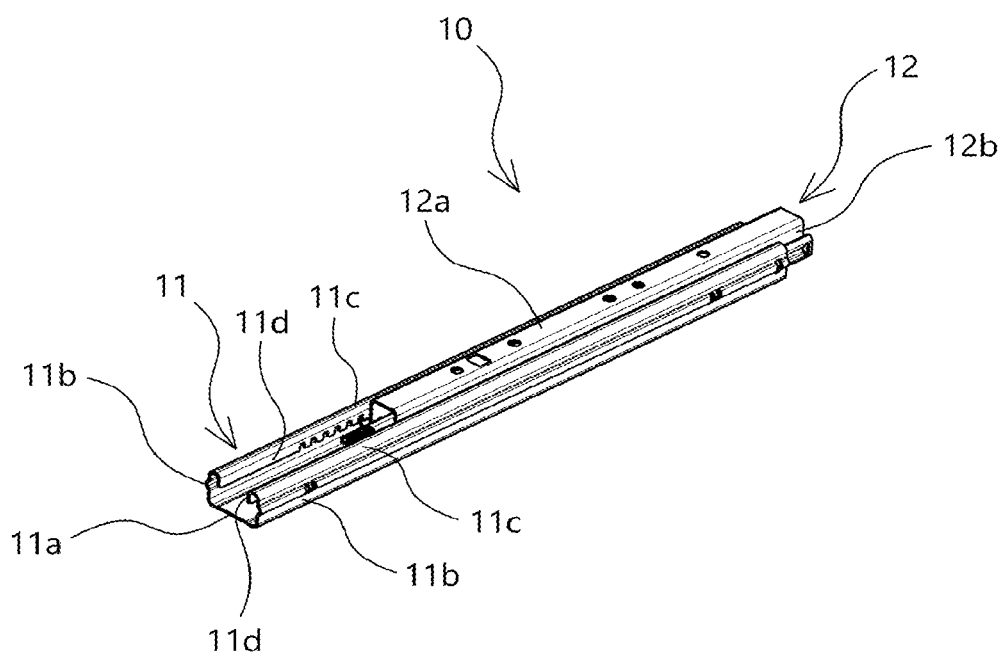
FIG. 4 is a perspective view illustrating one of the seat slide adjusters used in FIG. 1 to FIG. 3.
Figure 5:
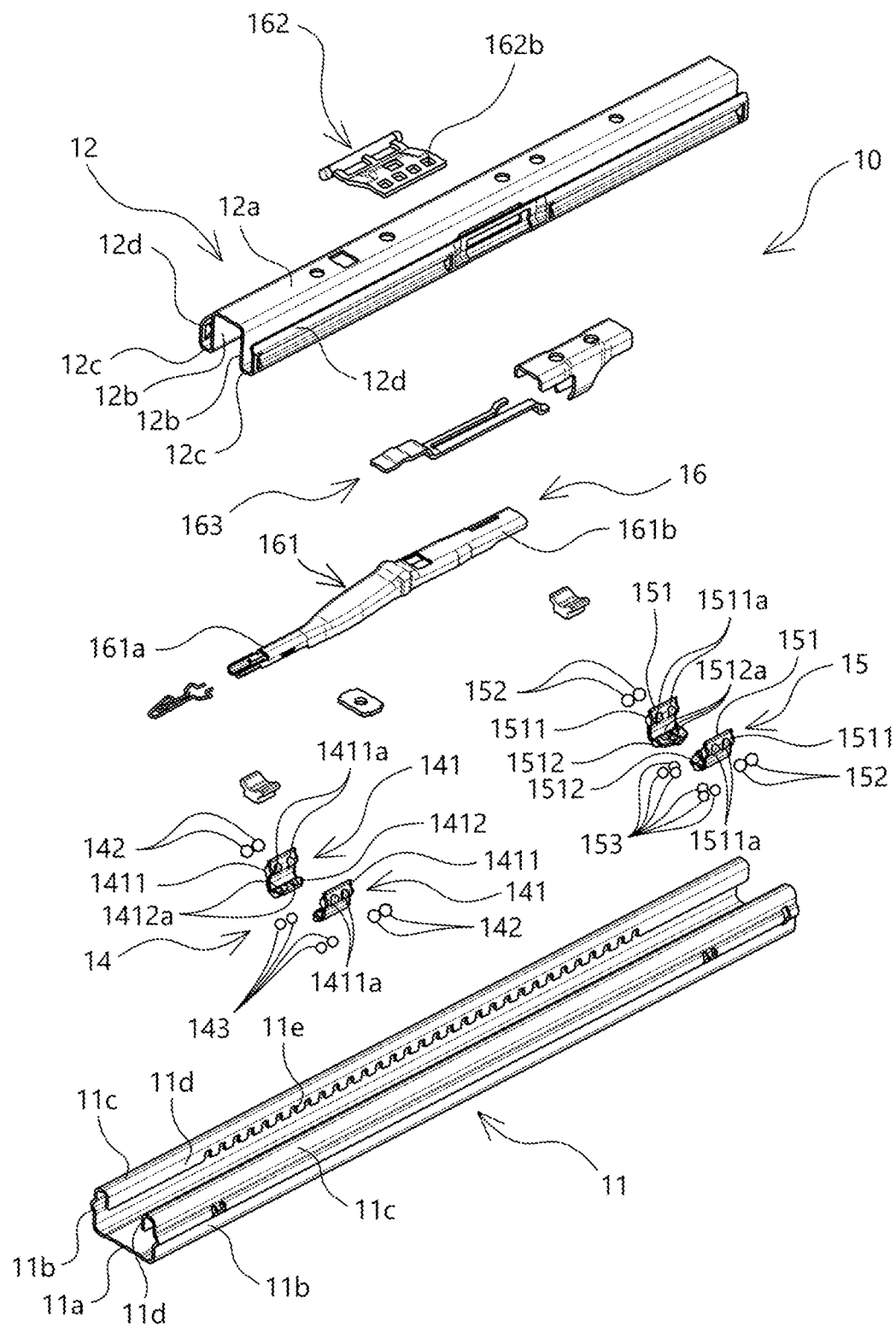
FIG. 5 is an exploded perspective view of the seat slide adjuster in FIG. 4.

The lower rail 11 has a bottom wall portion 11a, a pair of vertical wall portions 11b, 11b standing up from both sides of the bottom wall portion 11a and facing each other, a pair of upper wall portions 11c, 11c which are bent inward with respect to each other from upper edges of the vertical wall portions 11b, 11b, and simultaneously, whose facing edges are separated from each other at a predetermined distance, and inner wall portions 11d, 11d bent downward from inner edges of the upper wall portions 11c, 11c, and is formed in a substantially squared U shape with an upper surface open in a cross section in the width direction orthogonal to the longitudinal direction (refer to FIG. 4, FIG. 5 and FIGS. 7(a), (b)).

The upper rail 12 is formed in a substantially squared U shape with a lower surface open in the cross section in the width direction, which has an upper wall portion 12a and a pair of sidewall portions 12b, 12b bent downward from both sides of the upper wall portion 12a and facing each other. Further, from lower end portions of the sidewall portions 12b, 12b, bottom wall portions 12c, 12c bent outward with a predetermined width in a substantially horizontal direction are formed respectively, and moreover, vertical wall portions 12d, 12d folded back upward are formed from outer edges of the bottom wall portions 12c, 12c (refer to FIG. 4, FIG. 5 and FIGS. 7(a), (b)). Then, in a manner that the vertical wall portions 12d, 12d of the upper rail 12 face the vertical wall portions 11b, 11b of the lower rail 11 respectively, the vertical wall portions 12d, 12d of the upper rail 12 are positioned and disposed between the vertical wall portions 11b, 11b and the inner wall portions 11d, 11d of the lower rail 11 (refer to FIGS. 7(a), (b)).

Figure 6:
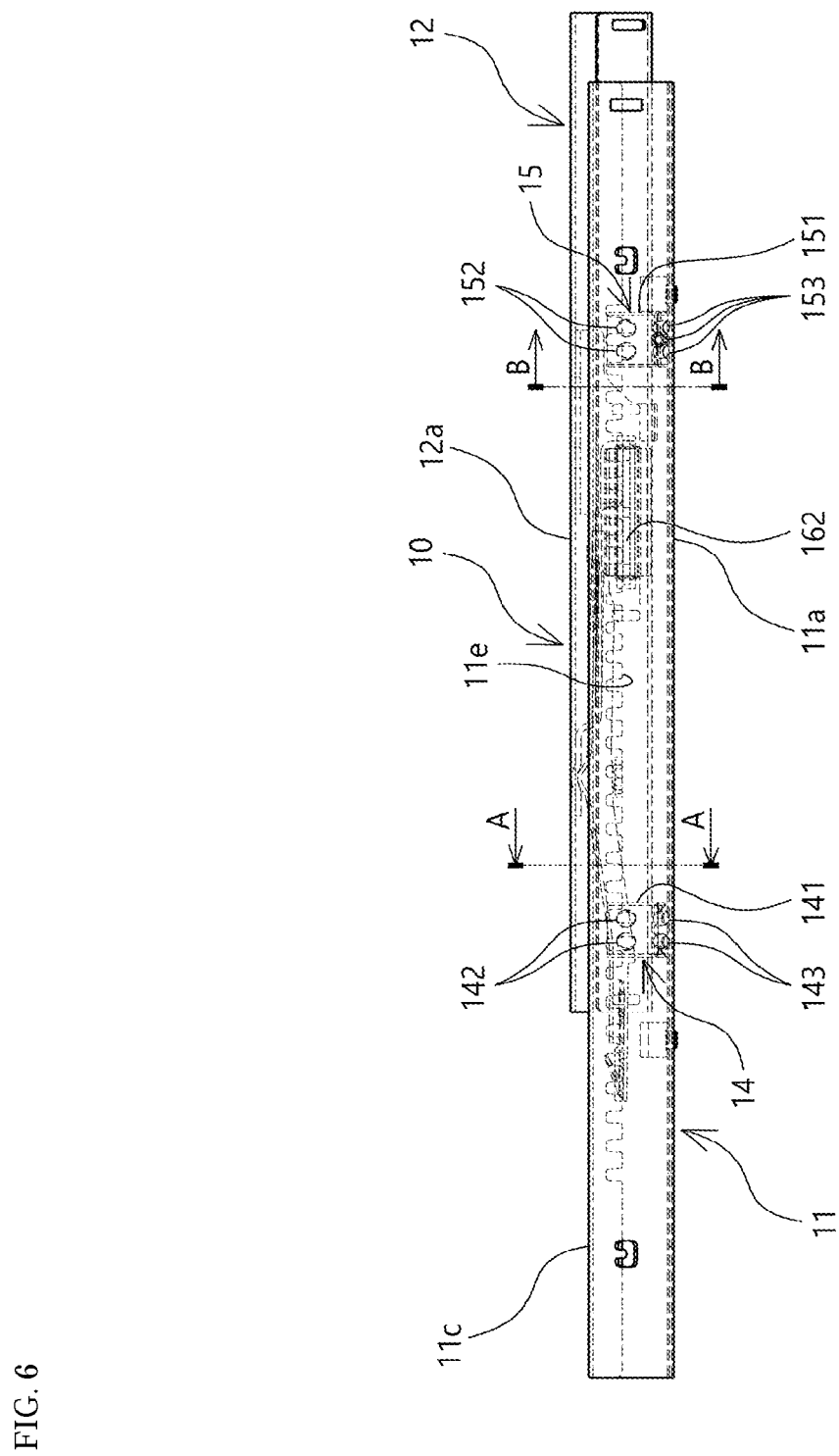
FIG. 6 is a side view of the seat slide adjuster in FIG. 4.
Figure 7:
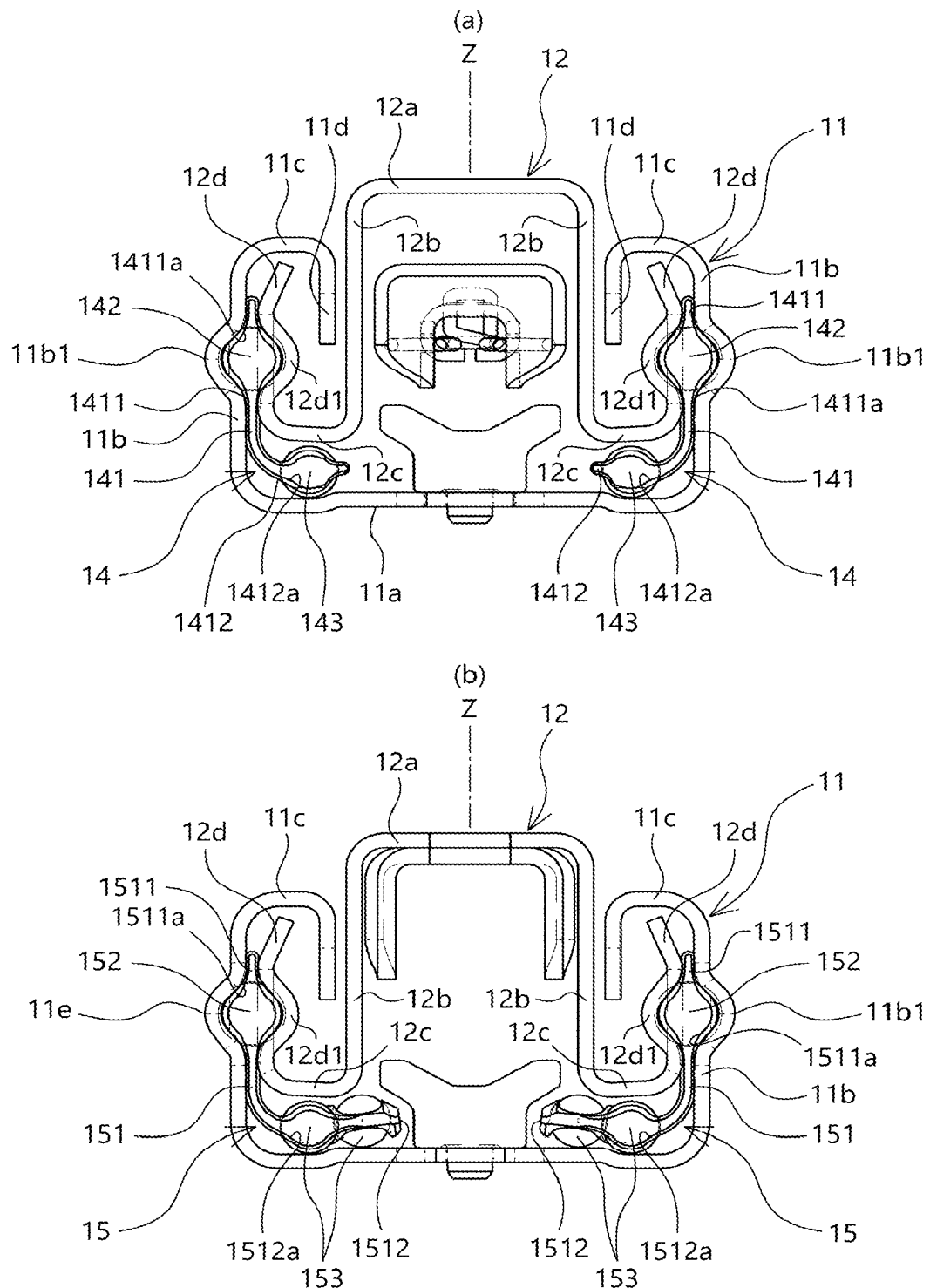
FIG. 7(a) is a sectional view taken along an A-A line in FIG. 6.
FIG. 7(b) is a sectional view taken along a B-B line in FIG. 6.
Figure 8:
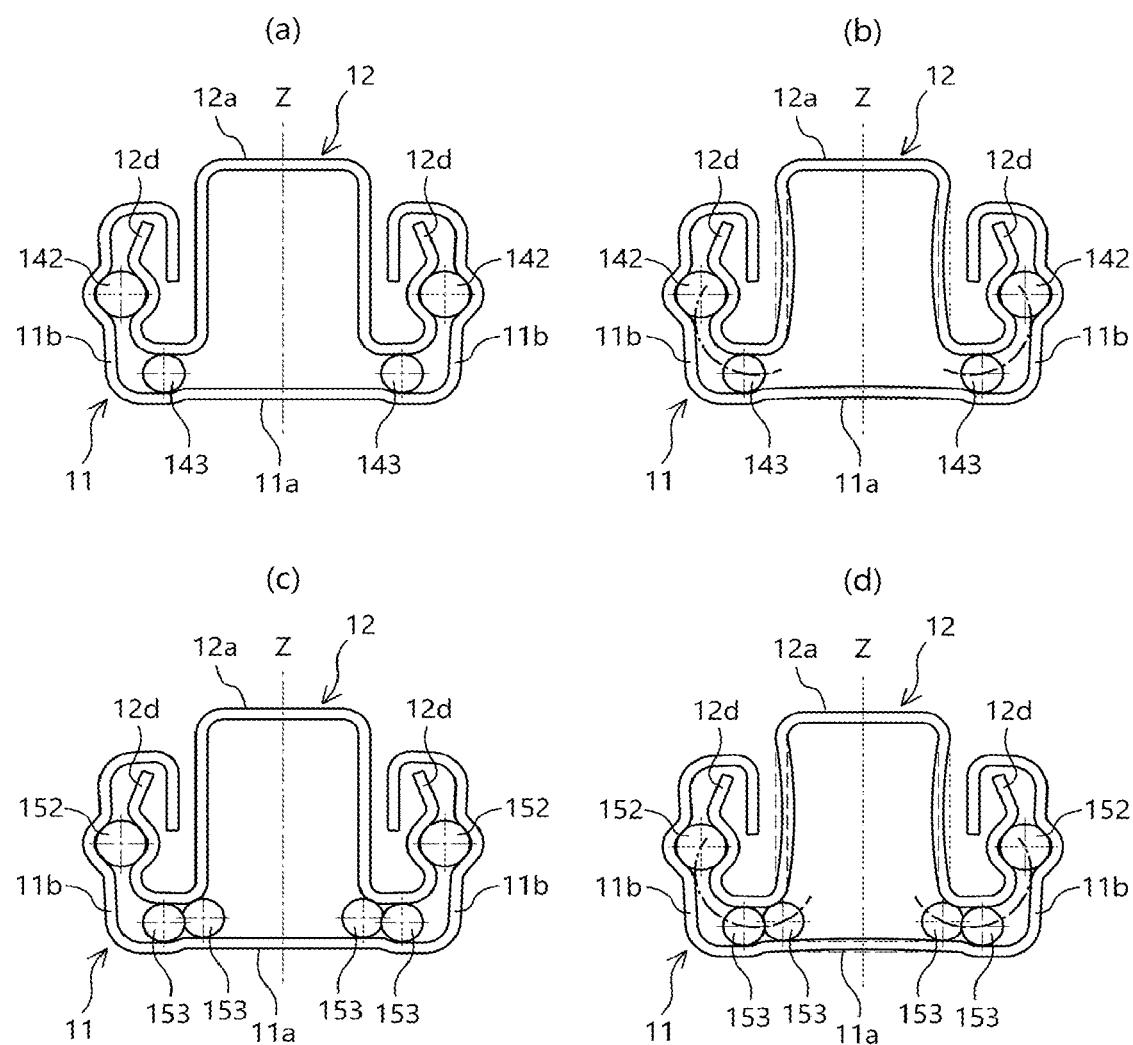
FIG. 8(a) illustrates movement of first and second ball members in front-side sliding resistance reducing members in a state before a load in a lateral direction is imposed on a lower rail and an upper rail.
FIG. 8(b) illustrates movement of the first and second ball members in the front-side sliding resistance reducing members when the load in the lateral direction is imposed on the lower rail and the upper rail.
FIG. 8(c) illustrates movement of first and second ball members in rear-side sliding resistance reducing members in the state before the load in the lateral direction is imposed on the lower rail and the upper rail.
FIG. 8(d) illustrates movement of the first and second ball members in the rear-side sliding resistance reducing members when the load in the lateral direction is imposed on the lower rail and the upper rail.

Between the lower rail 11 and the upper rail 12, as illustrated in FIG. 5, FIG. 6, and FIGS. 7(a), (b), sliding resistance reducing members 14, 15 are interposed. The sliding resistance reducing members 14, 15 are preferably provided in plurality at a predetermined distance in the longitudinal direction of the lower rail 11, and in this embodiment, provided close to a front portion and close to a rear portion of the lower rail 11.

A pair of the sliding resistance reducing members (hereinafter, "front-side sliding resistance reducing members") 14, 14 disposed close to the front portion are provided to substantially face each other with a center Z in the width direction of the lower rail 11 sandwiched and to respectively correspond to the right and left vertical wall portions 11b, 11b of the lower rail 11, as illustrated in FIG. 7(a). As illustrated in FIG. 5 and FIGS. 7(a), (b), the front-side sliding resistance reducing members 14, 14 are each in a substantially L shape in the cross section along the width direction, and simultaneously, have retainers (front-side retainers) 141, 141 the length along the longitudinal direction of the lower rail 11 of each of which is several cm (normally about 2 to 5 cm though it depends on a size of the seat slide adjuster 10). The front-side retainers 141 141 each in the substantially L shape in the cross section have first retaining wall portions 1411, 1411 extending in a vertical direction and second retaining wall portions 1412, 1412 extending in a lateral direction from lower portions of the first retaining wall portions 1411, 1411 toward the center in the width direction of the lower rail 11. The front-side sliding resistance reducing members 14, 14 are preferably formed of a synthetic resin, and have flexibility in which the first retaining wall portions 1411, 1411 bend relatively to the second retaining wall portions 1412, 1412.

The front-side retainers 141, 141 are disposed in a manner that the first retaining wall portions 1411, 1411 are positioned between the vertical wall portions 11b, 11b of the lower rail 11 and the vertical wall portions 12d, 12d of the upper rail 12, and the second retaining wall portions 1412, 1412 are positioned between the bottom wall portion 11a of the lower rail 11 and the bottom wall portions 12c, 12c of the upper rail 12.

In the first retaining wall portions 1411, 1411, ball member retaining portions 1411a, 1411a are each formed at one or more points. In this embodiment, the ball member retaining portions 1411a, 1411a are each formed at two points along the longitudinal direction of the lower rail 11, and in the respective ones, first ball members 142, 142 are rotatably disposed. In the first retaining wall portions 1411, 1411, the vicinity of a portion where the ball member retaining portions 1411a, 1411a are each formed bulges in thickness directions, and the ball member retaining portions 1411a, 1411a are each formed of holes obtained by penetrating the bulging portion in the thickness directions. The holes have a diameter at open ends smaller than a diameter of the first ball members 142, 142, and the first ball members 142, 142 each face the outside from the open ends and they are in contact with the vertical wall portions 11b, 11b of the lower rail 11 and the vertical wall portions 12d, 12d of the upper rail 12 to be rotatable.

Also in the second retaining wall portions 1412, 1412, ball member retaining portions 1412a, 1412a are each formed at one or more points. In this embodiment, the ball member retaining portions 1412a, 1412a are each formed at two points along the longitudinal direction of the lower rail 11. Then, second ball members 143, 143 are rotatably disposed in the ball member retaining portions 1412a, 1412a of the second retaining wall portions 1412, 1412. Also in the second retaining wall portions 1412, 1412, the vicinity of a portion where the ball member retaining portions 1412a, 1412a are each formed bulges in thickness directions, and the ball member retaining portions 1412a, 1412a are each formed of holes obtained by penetrating the bulging portion in the thickness directions. The holes have a diameter at open ends smaller than a diameter of the second ball members 143, 143, and the second ball members 143, 143 each face the outside from the open ends and they are in contact with the bottom wall portion 11a of the lower rail 11 and the bottom wall portions 12c, 12c of the upper rail 12 to be rotatable.

Here, when the front-side sliding resistance reducing members 14, 14 are seen in the cross section in the width direction illustrated in FIG. 7(a), the first ball members 142, 142 disposed in the first retaining wall portions 1411, 1411 are supported in positions apart from both the upper wall portions 11c, 11c and the bottom wall portion 11a of the lower rail 11 in ranges of the vertical wall portions 11b, 11b of the lower rail 11, and the second ball members 143, 143 are supported in positions apart from the vertical wall portions 11b, 11b of the lower rail 11 each toward the center Z in the width direction. In other words, the first retaining wall portions 1411, 1411 and the second retaining wall portions 1412, 1412, and, the ball member retaining portions 1411a, 1411a, 1412a, 1412a formed therein of the retainers 141, 141 each in the substantially L shape in the cross section are formed in a size having such a positional relationship as described above when disposed between the lower rail 11 and the upper rail 12.

Note that in the ranges of the vertical wall portions 11b, 11b of the lower rail 11 serving as disposed positions of the first ball members 142, 142, middle portions 11b1, 11b1 apart from both the upper wall portions 11c, 11c and the bottom wall portion 11a of the lower rail 11 are formed to bulge outward, and middle portions 12d1, 12d, of the vertical wall portions 12d, 12d of the upper rail 12 corresponding thereto are formed to bulge inward. This causes the ball members 142, 142 to be disposed at predetermined positions. Further, the first ball members 142, 142 are disposed to be sandwiched between the middle portions 11b1, 11b1 bulging outward in the vertical wall portions 11b of the lower rail 11 and the middle portions 12d1, 12d1 bulging inward in the vertical wall portions 12d of the upper rail 12, and thereby rigidity in the lateral direction of the lower rail 11 and the upper rail 12 is supplemented by the first ball members 142, 142. To enhance the rigidity in the lateral direction more, a diameter of the first ball members 142, 142 is preferably larger than a diameter of the second ball members.

A pair of the sliding resistance reducing members (hereinafter, "rear-side sliding resistance reducing members") 15, 15 disposed close to the rear portion are also provided to substantially face each other with the center in the width direction of the lower rail 11 sandwiched and to respectively correspond to the right and left vertical wall portions 11b, 11b of the lower rail 11, similarly to the front-side sliding resistance reducing members 14, 14, as illustrated in FIG. 7(b). The rear-side sliding resistance reducing members 15, 15 have almost the same structure as that of the front-side sliding resistance reducing members 14, 14, have retainers (rear-side retainers) 151, 151 the cross section in the width direction of each of which is in a substantially L shape and the length along the longitudinal direction of the lower rail 11 of each of which is also the same, and have first retaining wall portions 1511, 1511 extending in the vertical direction and second retaining wall portions 1512, 1512 extending in the lateral direction from lower portions of the first retaining wall portions 1511, 1511 toward the center Z in the width direction of the lower rail 11. Further, it is the same that they are preferably formed of a synthetic resin and have flexibility, and the first retaining wall portions 1511, 1511 bend relatively to the second retaining wall portions 1512, 1512.

The rear-side retainers 151, 151 are also disposed in a manner that the first retaining wall portions 1511, 1511 are positioned between the vertical wall portions 11b, 11b of the lower rail 11 and the vertical wall portions 12d, 12d of the upper rail 12, and the second retaining wall portions 1512, 1512 are positioned between the bottom wall portion 11a of the lower rail 11 and the bottom wall portions 12c, 12c of the upper rail 12.

In the first retaining wall portions 1511, 1511 of the rear-side retainers 151, 151, ball member retaining portions 1511a, 1511a are each formed at one or more points, and in this embodiment, each formed at two points along the longitudinal direction of the lower rail 11. Then, in the respective ones, first ball members 152, 152 are rotatably disposed in contact with the vertical wall portions 11b, 11b of the lower rail 11 and the vertical wall portions 12d, 12d of the upper rail 12. Further, also in the second retaining wall portions 1512, 1512, ball member retaining portions 1512a, 1512a are each formed at one or more points.

Further, when the rear-side sliding resistance reducing members 15, 15 are seen in the cross section in the width direction illustrated in FIG. 7(b), the first ball members 152, 152 disposed in the first retaining wall portions 1511, 1511 are supported in positions apart from both the upper wall portions 11c, 11c and the bottom wall portion 11a of the lower rail 11 in the ranges of the vertical wall portions 11b, 11b of the lower rail 11, and the second ball members 153, 153 are supported in positions apart from the vertical wall portions 11b, 11b of the lower rail 11 each toward the center Z in the width direction. That is, the first retaining wall portions 1511, 1511 and the second retaining wall portions 1512, 1512, and, the ball member retaining portions 1511a, 1511a, 1512a, 1512a formed therein of the retainers 151, 151 each in the substantially L shape in the cross section are formed in a size having such a positional relationship as described above when disposed between the lower rail 11 and the upper rail 12. These points are also the same as those in the front-side sliding resistance reducing members 14, 14.

Further, it is the same that the first ball members 152, 152 are sandwiched and disposed between middle portions 11b1, 11b1 bulging to outward in the vertical wall portions 11b of the lower rail 11 and middle portions 12d1, 12d1 bulging inward in the vertical wall portions 12d of the upper rail 12, and the first ball members 152, 152 and the second ball members 153, 153 are supported through the retainers 151, 151 each in the substantially L shape in the cross section, and thereby the rigidity in the lateral direction of the lower rail 11 and the upper rail 12 is enhanced.

However, as illustrated in FIG. 5 and FIG. 7(b), the ball member retaining portions 1512a, 1512a of the second retaining wall portions 1512, 1512 of the rear-side retainers 151, 151 are each formed at three points in this embodiment. Specifically, they are first each formed at two points along the longitudinal direction of the lower rail 11 in positions apart by a predetermined distance from the vertical wall portions 11b, 11b of the lower rail 11 toward the center Z in the width direction of the lower rail 11, and simultaneously, further each formed at one point close to the center in the width direction of the lower rail 11. Note that to correspond to this, the second retaining wall portions 1512, 1512 of the rear-side retainers 151, 151 each have a shape which is a substantially triangle in plan view and whose top side goes toward the center Z in the width direction of the lower rail 11.

Further, the second ball members 153, 153 are each disposed at these three points of each of the ball member retaining portions 1512a, 1512a formed in the second retaining wall portions 1512, 1512 to be disposed in a total of three. A larger load is imposed close to the rear portion than close to the front portion by about 10 to 30% on the seat slide adjuster 10. Hence, the number of the second ball members 153, 153 disposed in the second retaining wall portions 1512, 1512 of the rear-side retainers 151, 151 is preferably larger than that of the second ball members 143, 143 disposed in the front-side retainers 141, 141 to disperse a bearing pressure.

The seat slide adjuster 10 of this embodiment has the above-described sliding resistance reducing members 14, 15. Both the front-side retainers 141, 141 and the rear-side retainers 151, 151 are each in the substantially L shape in the cross section, and respectively have the first retaining wall portions 1411, 1411, 1511, 1511 in which the first ball members 142, 142, 152, 152 are disposed and the second retaining wall portions 1412, 1412, 1512, 1512 in which the second ball members 143, 143, 153, 153 are disposed. Then, the second retaining wall portions 1412, 1412, 1512, 1512 are disposed between the bottom wall portion 11a of the lower rail 11 and the bottom wall portions 12c, 12c of the upper rail 12, and the first retaining wall portions 1411, 1411, 1511, 1511 are disposed between the vertical wall portions 11b, 11b of the lower rail 11 and the vertical wall portions 12d, 12d of the upper rail 12. Moreover, the first ball members 142, 142, 152, 152 are supported in the positions apart from both the upper wall portions 11e, 11e and the bottom wall portion 11a of the lower rail 11 in the ranges of the vertical wall portions 11b, 11b of the lower rail 11, and the second ball members 143, 143, 153, 153 are supported in the positions apart from the vertical wall portions 11b, 11b of the lower rail 11 each toward the center Z in the width direction. That is, the first ball members 142, 142, 152, 152 do not correspond to such portions having high rigidity as corner portions between the vertical wall portions 11b, 11b and the upper wall portions 11c, 11c of the lower rail 11 and corner portions between the vertical wall portions 11b, 11b and the bottom wall portion 11a of the lower rail 11, but are disposed in positions having lower rigidity at the middles of them. Further, the second ball members 143, 143, 153, 153 are respectively connected to the first ball members 142, 142, 152, 152 by the retainers 141, 141, 151, 151 each in the substantially L shape in the cross section.

From a normal seating state illustrated in FIGS. 8(a), (c), when an external force is exerted from an up-down direction and the lateral direction by a posture change, a vibration input, or the like as illustrated in FIGS. 8(b), (d), the retainers 141, 141, 151, 151, each in the substantially L shape in the cross section, disposed symmetrically with the center Z in the width direction sandwiched and the first ball members 142, 142, 152, 152 and the second ball member 143, 143, 153, 153 retained therein integrally exhibit predetermined rigidity. This causes a deflection in the lateral direction of the lower rail 11 and the upper rail 12 to be suppressed to secure the rigidity in the lateral direction of them. In particular, the larger diameter of the first ball members 142, 142, 152, 152 than the diameter of the second ball members 143, 143, 153, 153 as described above allows such rigidity in the lateral direction to be secured higher. The second ball members 143, 143, 153, 153 receive the force in the up-down direction. As a result, the upper rail 12 and the lower rail 11 receive the force through deflections in the sidewall portions 12b, 12b of the upper rail 12 and a middle range in the bottom wall portion 11a of the lower rail 11 which do not directly correspond to disposed positions of the sliding resistance reducing members 14, 15. Therefore, rattling between the upper rail 12 and the lower rail 11 is eliminated and smoothness at the time of sliding is secured, which enables prevention of abnormal sound.

Using the sliding resistance reducing members 14, 15 of this embodiment causes the occurrence of rattling and abnormal sound at the time when the external force is loaded to be suppressed, and the first ball members 142, 142, 152, 152 and the second ball members 143, 143, 153, 153 to roll with respect to surfaces of the vertical wall portions 12d, 12d and the bottom wall portions 12c, 12c of the upper rail 12 also at the time of sliding, resulting in a configuration capable of securing high slidability. That is, the sliding resistance reducing members 14, 15 of this embodiment have a function of supplementing the rigidity of the lower rail 11 and the upper rail 12, and allow a thinner material even in the same one to be used as a raw material forming the lower rail 11 and the upper rail 12, resulting in enabling a contribution to a reduction in weight of the seat slide adjuster 10.

Note that in FIG. 5, a reference sign 16 indicates a locking mechanism. The locking mechanism 16 includes a release lever 161 and a lock member 162. The release lever 161 has a predetermined length and is disposed inside the lower rail 11 and the upper rail 12. A front end portion 161a of the release lever 161 protrudes from a front end of the upper rail 12, and the above-described slide lever 17 to be operated by a person is coupled to the front end portion 161a. In the release lever 161, up and down displacements of the front end portion 161a cause displacements of a rear end portion 161b in the opposite directions centered at a middle portion in the longitudinal direction. Hence, as long as the lock member 162 including an engaging portion 162b (in this embodiment, formed of holes into which projecting pieces are inserted) engaging in a portion to be engaged 11e (in this embodiment, formed of the plurality of projecting pieces provided in a comb teeth shape in the inner wall portions 11d, 11d) formed in the lower rail 11 is linked to the rear end portion, the slide lever 17 is lifted upward to displace the front end portion 161a of the release lever 161 upward, which causes the engaging portion 162b of the lock member 162 to separate from the portion to be engaged 11e to be in an unlocked state, resulting in enabling frontward and rearward slide movement. A displacement of the release lever 161 in the opposite direction causes the engaging portion 162b to engage in the portion to be engaged 11e to be in a locked state, and the movement in the opposite direction is made by elastic force of a leaf spring member 163 which biases the release lever 161 in an engaging direction.

INDUSTRIAL APPLICABILITY

The seat slide adjuster of the present invention is suitably used in automobiles as described in the above embodiment, and also applicable to a seat for various vehicles such as airplanes, trains, ships, and buses.

EXPLANATION OF REFERENCE SIGNS 10 seat slide adjuster
11 lower rail
11a bottom wall portion
11b vertical wall portion
11c upper wall portion
12 upper rail
12a upper wall portion
12b sidewall portion
12c bottom wall portion
12d vertical wall portion
14 sliding resistance reducing member (front-side sliding resistance reducing member)
141 retainer (front-side retainer)
1411 first retaining wall portion
1411a ball member retaining portion
1412 second retaining wall portion
1412a ball member retaining portion
142 first ball member
143 second ball member
15 sliding resistance reducing member (rear-side sliding resistance reducing member)
151 retainer (rear-side retainer)
1511 first retaining wall portion
1511a ball member retaining portion
1512 second retaining wall portion
1512a ball member retaining portion
152 first ball member
153 second ball member
16 locking mechanism
17 slide lever

The invention claimed is:

1. A seat slide adjuster comprising:
a lower rail;
an upper rail slidably provided in the lower rail and coupled to a seat frame; and
sliding resistance reducing members respectively provided on a left side and a right side with a center in a width direction orthogonal to a longitudinal direction of the lower rail sandwiched for reducing, between the lower rail and the upper rail, sliding resistance to each other,
the sliding resistance reducing member comprising:
a retainer in a substantially L shape in a cross section, the retainer including a first retaining wall portion located between vertical wall portions of the lower rail and the upper rail and a second retaining wall portion located between bottom wall portions of the lower rail and the upper rail and extending from a lower portion of the first retaining wall portion toward the center in the width direction in the cross section along the width direction;
a first ball member supported by the first retaining wall portion and being capable of abutting on the vertical wall portions of the lower rail and the upper rail; and
a second ball member supported by the second retaining wall portion and being capable of abutting on the bottom wall portions of the lower rail and the upper rail,
the first ball member being supported in a position apart from both an upper wall portion and the bottom wall portion of the lower rail in a range of the vertical wall portion of the lower rail, and the second ball member being supported in a position apart from the vertical wall portion toward the center in the width direction of the lower rail.

2. The seat slide adjuster according to claim 1, wherein the first ball member is larger in diameter than the second ball member.

3. The seat slide adjuster according to claim 1, wherein a plurality of the first ball members and a plurality of the second ball members are provided along the longitudinal direction.

4. The seat slide adjuster according to claim 1,
wherein a plurality of the sliding resistance reducing members are provided at a predetermined distance in the longitudinal direction, and
wherein the disposition number of the second ball members supported by the retainer disposed close to a rear portion is larger than the disposition number of the second ball members supported by the retainer disposed close to a front portion.

* * * * *